(12) United States Patent
Little

(10) Patent No.: US 7,079,727 B1
(45) Date of Patent: Jul. 18, 2006

(54) INTEGRATED OPTICAL MODE SHAPE TRANSFORMER AND METHOD OF FABRICATION

(75) Inventor: Brent E. Little, Columbia, MD (US)

(73) Assignee: Little Optics, Inc., Annapolis Junction, MD (US)

( * ) Notice: Subject to any disclaimer, the term of this patent is extended or adjusted under 35 U.S.C. 154(b) by 147 days.

(21) Appl. No.: 10/684,899

(22) Filed: Oct. 9, 2003

Related U.S. Application Data

(60) Provisional application No. 60/417,239, filed on Oct. 9, 2002.

(51) Int. Cl.
*G02B 6/26* (2006.01)
*G02B 6/30* (2006.01)
*G02B 6/10* (2006.01)

(52) U.S. Cl. .......................... 385/28; 385/43; 385/49; 385/130

(58) Field of Classification Search ................. 385/14, 385/27, 28, 39, 43, 49, 52, 130–132
See application file for complete search history.

(56) References Cited

U.S. PATENT DOCUMENTS

| | | | |
|---|---|---|---|
| 5,199,092 A | 3/1993 | Stegmueller | |
| 5,703,895 A | 12/1997 | Ghirardi et al. | |
| 6,108,478 A | 8/2000 | Harpin et al. | |
| 6,229,947 B1 | 5/2001 | Vawter et al. | |
| 6,253,099 B1 | 6/2001 | Oskin et al. | |
| 6,411,764 B1 * | 6/2002 | Lee | 385/131 |
| 6,760,520 B1 * | 7/2004 | Medin et al. | 385/43 |
| 2002/0039469 A1 * | 4/2002 | Jeong et al. | 385/43 |
| 2002/0085602 A1 * | 7/2002 | Park et al. | 372/43 |
| 2003/0044118 A1 * | 3/2003 | Zhou et al. | 385/43 |
| 2003/0053756 A1 * | 3/2003 | Lam et al. | 385/49 |
| 2004/0017976 A1 * | 1/2004 | Luo et al. | 385/43 |

FOREIGN PATENT DOCUMENTS

| | | |
|---|---|---|
| WO | PCT/US01/41142 | 1/2002 |
| WO | PCT/US02/10416 | 5/2003 |

OTHER PUBLICATIONS

Y. Shani, "Efficient Coupling of a Semiconductor Laser to an Optical Fiber by Means of a Taperred Waveguide on Silicon", Applied Physics Letters vol. 55, No 23, pp 2389-2391, 1989.

(Continued)

*Primary Examiner*—John D. Lee
*Assistant Examiner*—Tina M Wong
(74) *Attorney, Agent, or Firm*—Dunlap, Codding & Rogers, P.C.

(57) ABSTRACT

An integrated optical mode transformer provides a low loss interconnection between an optical fiber and an integrated optic waveguide having a spot size different from that of the fiber. The mode transformer is comprised of two waveguide layers, an upper layer and a lower layer, with the upper layer being contiguous to the lower layer. The lower layer is the integrated optic waveguide layer forming the optical circuit. The input dimensions of the composite two-waveguide structure supports a fundamental mode that accepts all of the light present on the optical fiber. The upper waveguide layer is tapered down from an input width to an output width and then terminates in such a way that at the termination substantially all of the input optical power resides in the lower waveguide layer. The two waveguide layer structure is fabricated by deposition and planarization techniques.

8 Claims, 12 Drawing Sheets

OTHER PUBLICATIONS

T. Brenner et al, "Integrated Optical Modeshape Adapter in InGaAsP/InP for Efficient Fiber-to-Waveguide Coupling", IEEE Photonics Tech. Lett. vol 5, No 9, pp 1053-1056, 1993.

R. Zengerle et al, "Laterally Tapered InP-InGaAsP Waveguides for Low Loss Chip-to-Fiber Butt Coupling: A Comparison of Different Configurations" IEEE Photonics Tech. Lett., vol 7, No 5, pp 532-534, 1995.

B. Rahman et. al., "Improved Laser-Fiber Coupling by Using a Spot-Size Transformer," IEEE Photonics Technology Lett, vol 8, No 4, pp. 557-559 1996.

G. Vawter et. al., "Tapered Rib Adiabatic Following Fiber Couplers in Etched GaAs Materials for Monolithic Spot Size Transformation," IEEE J. Selected Topics Quantum Elect. vol 3, No 6, pp 1361-1371, 1997.

I. Moerman et. al., "A Review on Fabrication Technologies for the Monolithic Integration of Tapers with III-V Semiconductor Devices," IEEE J. Selected Topics Quantum Elect., vol 3, No 6, pp. 1308-1320, 1997.

* cited by examiner

Lateral Cross Section View
☒ Fiber matched guide
▧ Bus core
⊡ Bottom cladding
⊡ Top cladding
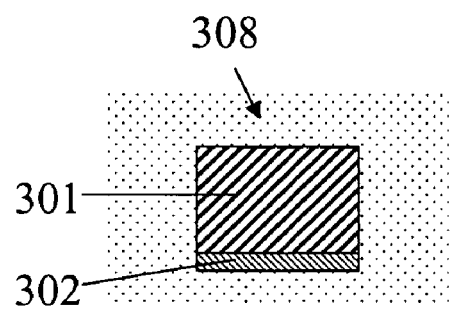
Fig. 5a
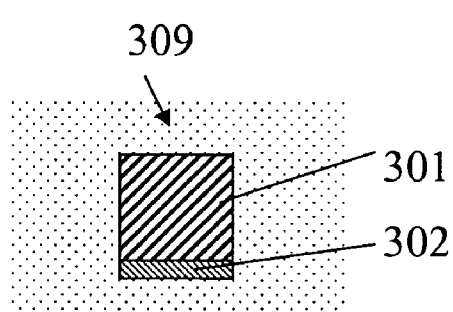
Fig. 5b
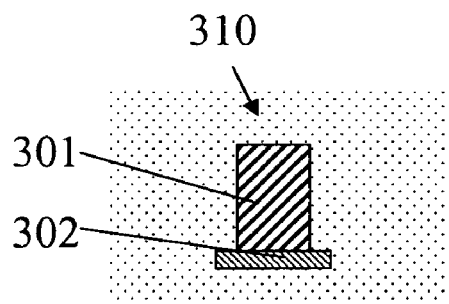
Fig. 5c
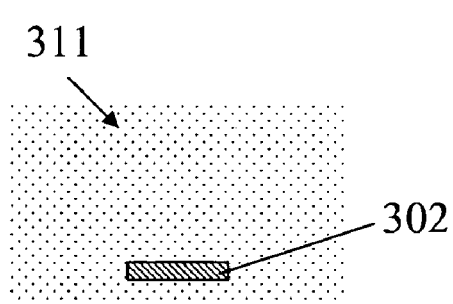
Fig. 5d
Figure 5

Longitudinal Cross Section View

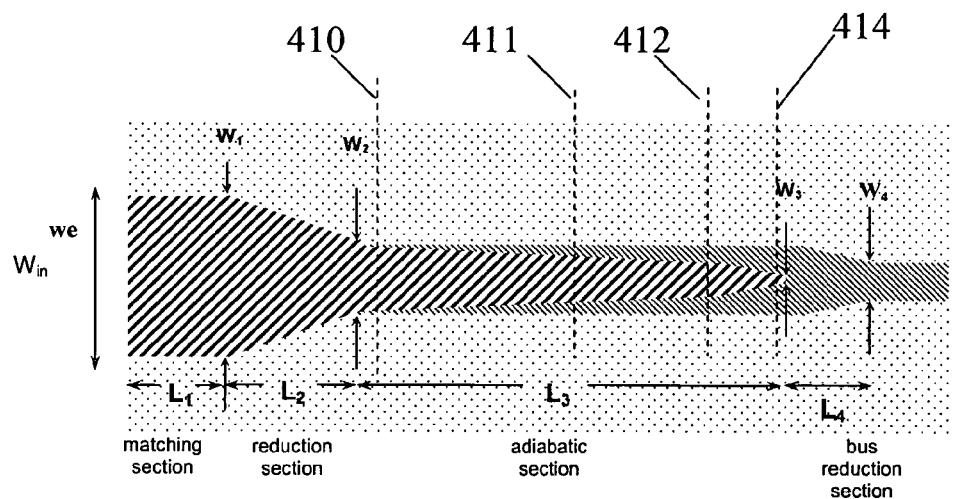
Fig. 9a
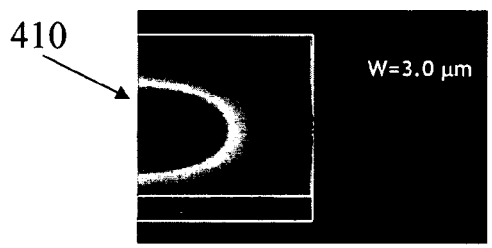
Fig. 9b
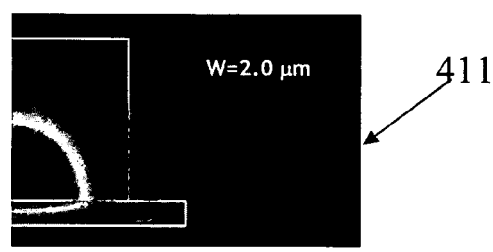
Fig. 9c
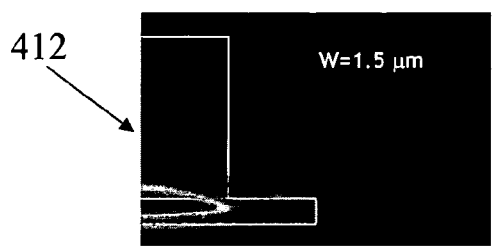
Fig. 9d
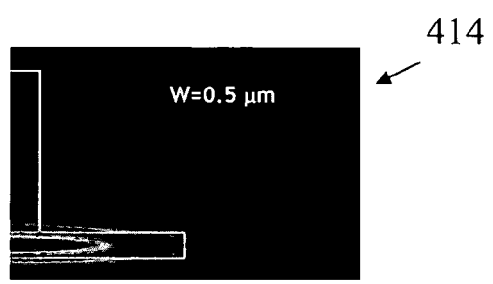
Fig. 9e
Figure 9

INTEGRATED OPTICAL MODE SHAPE TRANSFORMER AND METHOD OF FABRICATION

CLAIM TO PRIORITY

Applicants hereby claim priority under all rights to which they are entitled under 35 U.S.C. Section 119 based upon the Provisional Application Ser. No. 60/417,239 for this patent application filed at the United States Patent and Trademark Office on Oct. 9, 2002.

BACKGROUND OF THE INVENTION—FIELD OF INVENTION

This invention relates to a structure for the low loss connection of an optical fiber to an integrated optical waveguide having different dimensions from the fiber. More specifically it relates to a mode shape transformer fabricated as an integrated optical waveguide structure that is used for changing the shape and dimension of an optical mode field of an integrated optical waveguide so that it matches the mode field shape of an input optical fiber.

BACKGROUND OF THE INVENTION

The invention relates to the field of semiconductor and dielectric optical components used for optical transmission or optical digital data processing. It pertains especially to all optical components comprising active and/or passive waveguides and also to single and multimode fibers, for example components such as semiconductor lasers, semiconductor amplifiers, modulators, and wavelength filters, to name a few. There is a great deal of ongoing research and development effort to reduce the cost and size of optical modules while maintaining the minimum loss of optical power. A major component of the fabrication costs usually arises from the joining of such components to optical fibers, as for example when it is necessary to couple optical modes of very different sizes. Thus, when a high-index contrast (HC) waveguide and a flat-end single-mode optical fiber are joined together, the optical mode of the HC guide spot size with a diameter of, for example 1–2 µm, has to be coupled with the optical mode of a single mode (SM) optical fiber whose diameter is far greater, for example in the range of 6–10 µm.

To enable the coupling of these optical modes of very different sizes, spot-size converters or mode shape transformers (or mode transformer for short) are made in order to increase the size of the mode at the output of the optical component and make its profile compatible with that of the mode guided in the optical fiber. The reverse can also be accomplished to decrease the size of the mode from a single mode (SM) fiber to a high-index contrast (HC) waveguide. In any case, this mode matching must be done while preserving the performance characteristics of the component.

For instance, in directly connecting a SM fiber having a mode spot size of 8 µm, to a HC waveguide having a spot size of 1.5 µm, over 90% of the power will be lost. Such loss is intolerable in optical communication systems. FIG. 1 shows the relative sizes of the modes (field patterns) of a conventional SM fiber (100), and that of a HC waveguide. (110). The SM fiber spot size is typically 5–10 µm which is as much as an order of magnitude greater than that of an HC waveguide—typically 1–2 µm.

When transforming the modes between two waveguides with different refractive index and/or core sizes, high coupling loss arises due to the difference in mode size, shape, and mode velocity. For example, the index difference and the mode size of a fiber optic waveguide are different than those of a high index difference planar waveguide, resulting in high coupling loss when the fiber optic waveguide and the high index difference planar waveguide are directly coupled.

A channel waveguide is a dielectric waveguide whose core is surrounded by a cladding that is comprised of materials with refractive indices lower than that of the core, and wherein the peak optical intensity resides in the core. Waveguides in general can be defined by other geometries as well. In all waveguide cases, the cladding is defined as a region where the evanescent field of optical modes exists. A high index contrast (HC) waveguide is defined as one where the core cladding index contrast is larger than that of a typical single mode fiber (that is, larger than approximately 1%). HC waveguides also typically have mode field diameters that are smaller than that of a single mode fiber by a factor of two or more.

In optical components, it is essential to have low coupling loss when attaching a fiber to a microchip. To efficiently couple two waveguides with very different dimensions and therefore two different spot sizes, some sort of mode shape transformer is required. As shown in FIG. 2, the mode shape transformer essentially acts as a funnel, necking down a wide area spot from the SM fiber (200) to a small area spot associated with the HC waveguide (220). FIG. 2 depicts the functionality of such a mode transformer (210).

A mode transformer between two different waveguides is an essential part of an optical system where the lightwave (mode) from one optical component is coupled into another component. In optical communication, a mode transformer between an optical fiber waveguide and a high index difference (difference in the refractive indices of core and cladding) planar waveguide is crucial for successful implementation of planar lightwave circuits (PLC) in fiber communication. Therefore, developing an efficient mode transformer between two waveguides has continued to be a subject of intense development.

In addition, the core index of the fiber optic waveguide is lower than that of the high index difference planar waveguide causing a mode velocity difference between two waveguides. As will be detailed in the Detailed Description section, when such a change in mode properties takes place too quickly, high power loss arises.

BACKGROUND OF THE INVENTION—PRIOR ART

There have been several other approaches to achieve efficient mode coupling between two waveguides with different index difference, including mode transformation by tapering the dimension of high index difference waveguides. Mode transformation by a taper has been shown in various publications. Over the tapering region of the high index difference waveguide, the thickness or width of the waveguide core is gradually tapered down from that of the normal guiding region to a lower thickness or width. As the mode travels from the normal guiding region of the high index difference waveguide into the tapering region, the mode experiences decreasing amount of the core material. The fraction of the mode field distribution that exists outside the core material increases, changing the mode size. The index of the waveguide that the mode experiences is effectively changed by the presence of the taper. In other words, the "effective index" is gradually changed by the taper. By gradually changing the effective index from that of the low index waveguide to that of the high index difference waveguide, the mode coupling can be achieved between two waveguides without high loss. The method to determine the effective index is described in "The Handbook of Photonics", Boca Raton, Fla. CRC Press, 532–535 (1996) by M. Gupta.

T. Brenner et. al. ("Integrated optical modeshape adapters in InGaAsP/InP for efficient fiber-to-waveguide coupling," IEEE Photonics Tech. Lett. Vol. 5, No. 9, 1993) show a mode transformer using a vertically tapered high contrast waveguide. Vertical tapering uses special etching techniques that are not well controlled and therefore difficult to manufacture. Also the vertical taper shape cannot be arbitrarily specified, but is more a function of etching characteristics, rather than design. The mode size propagating in the tapered region increases due to the reduction of the effective index, and thus the reduction of the effective index difference. The publication indicates the gradual mode transformation occurring in one waveguide due to the presence of a taper.

U.S. Pat. No. 5,199,092, issued to Stegmueller et al. shows the coupling of modes between two different waveguides: one broad and one narrow. The two waveguides run parallel to one another and are superimposed with each other to provide a superimposing waveguide guidance. During the superimposed waveguide guidance, one of the two waveguides is tapered down in vertical dimension, while the other waveguide dimension is kept constant. The role of the tapered waveguide is to provide a gradual effective index change, and thus mode transformation, in the same manner as the cases cited in journal publications including that by Brenner et al. The difference is the superimposition of the narrow waveguide, providing waveguiding in the broad waveguide once the narrow waveguide is completely terminated by the vertical taper. The broad waveguide is surrounding the narrow waveguide over the whole waveguiding distance. The presence of the broad waveguide helps guiding the mode once the mode transformation is complete.

In addition to single taper devices described above, dual tapers are used in mode transformation between two different waveguides. IEEE Photonic Technology Letters, Vol. 7, No. 5, May 1995 by Zengerle et al., reports a mode transformer having two channel waveguides, each with a taper, one sitting on top of the other. Electronics Letters, Vol. 29, No. 4, February 1993 by Schwander et al., reports a mode transformer having two rib waveguides, each with a taper, a portion of one embedded within the other. Both of the rib waveguides used in the art are weakly guiding. This is not a suitable method for mode transformation to or from a high index difference waveguide.

Y. Shani et. al. ("Efficient coupling of a semiconductor laser to an optical fiber by means of a tapered waveguide on silicon", Appl. Phys. Lett. vol. 55, No. 23, 1989.) describe a mode transformer using a taper embedded within a second larger waveguide. Their taper is however adiabatic. In that case the taper was wedge shaped (linearly tapered) and very long in order to make use of the adiabatic mechanism. The taper is required to also come down to a sharp point, which makes it almost impossible to perform in a lithographic process.

B. M. A. Rahman et. al. ("Improved laser-fiber coupling by using spot-size transformer", IEEE Photonics Technology Lett. Vol. 8, No. 4, 1996) describe a mode transformer using two synchronously coupled waveguides, where one guide is a smaller high contrast guide and the other has a spot size approximating the size of a fiber mode. Their mode transformer does not use any mode evolution process, and the coupling is not terminated, causing coupling to periodically transfer between the two guides indefinitely.

G. A. Vawter et. al. ("Tapered rib adiabatic following fiber couplers in etched GaAs materials for monolithic spot-size transformation," IEEE J. Selected Topics Quantum Electronics, Vol. 3, No. 6, 1997) show an adiabatic coupler from one waveguide to another where the high contrast waveguide is on top of the larger fiber-matched waveguide.

Variations of the above types of mode transformers can also be found in several review articles, including that by I. Moerman et. al. (A review of fabrication technologies for the monolithic integration of tapers with III-V semiconductor devices, "IEEE J. of Selected Topics Quantum Electronics," Vo. 3, No. 6, 1997) which summarizes primarily dual type waveguide tapering.

In U.S. Pat. No. 6,253,009 entitled "SEMICONDUCTOR OPTICAL COMPONENT COMPRISING A SPOT-SIZE CONVERTER", the invention relates more particularly to a semiconductor optical component, comprising an active waveguide and a passive waveguide that are superimposed and buried in a sheathing layer, wherein the component comprises successively: a damped coupling section in which the width of the active waveguide tapers down and the width of the passive waveguide increases, and a mode expansion section comprising only the passive waveguide whose width tapers down. According to another characteristic of the invention, the component furthermore comprises a transition section positioned between the damped coupling section and the mode expansion section, in which the width of the active waveguide tapers down to 0 um. The invention enables the making of an optical component comprising an integrated spot-size converter, wherein the optical mode is chiefly deconfined in the passive quide so much so that the current threshold and the efficiency of the component are not affected. The passive and active waveguides are not aligned but they are coupled vertically, so much so that the problems related to alignment are prevented. Furthermore, the two types of active and passive waveguide may be optimized separately.

A third approach that has been envisaged in order to obtain a spot-sized converter integrated into an optical component requires an active waveguide and a passive waveguide that are superimposed so as to create a damped vertical coupling zone, wherein the width of the active waveguide tapers down gradually to deconfine the mode, and the width of the passive waveguide increases very rapidly and then becomes constant throughout the length of this section. The two guides, namely the active guide and the passive guide, are furthermore buried in a sheathing layer. In this case, the width of the coupling section must be sufficient to enable complete deconfinement of the optical mode in the entire active guide. This length is generally greater than 150 um. Furthermore, as and when it gets deconfined, the optical mode transits through the passive guide. The passive guide has a constant width of about 4 um and a very small thickness of about 50 nm to enable the deconfinement of the mode. For, an excessive thickness of this passive guide would prevent the deconfinement of the mode in the active guide. This is why the passive generally has a thickness of less than 100 nm.

The major drawback of this approach lies in the fact that the deconfinement of the mode is done entirely in the active guide. This leads to a deterioration of the performance characteristics of the component, especially its threshold current and its efficiency. Furthermore, the optical coupling losses with a single-mode optical fiber are still high. They are about 4.5 dB.

None of the prior art provides for an efficient mode transformation between a low index difference and a high index difference waveguide on a microchip. This invention discloses, for the first time, an efficient optical mode transformer based on a taper design, useful for transforming the mode to a high index difference waveguide on a semiconductor microchip. The matching of the optical mode according to the invention is performed chiefly in the HC waveguide that is embedded on the semiconductor microchip.

BRIEF DESCRIPTION OF THE DRAWINGS

FIG. 5 shows a lateral cross sectional view of one embodiment of present mode shape transformer invention.

FIG. 9 shows a detailed simulation of the optical field propagating in the mode shape transformer.

DETAILED DESCRIPTION OF THE INVENTION

The following description will further help to explain the inventive features of the Optical Mode Shape Transformer.

The approach used in this invention is to separate the problem into two steps with definitive objectives. The first objective is to get optical power from the SM fiber onto the chip with the highest possible efficiency. Once high efficiency connectivity and optical power transmission is established onto the chip, power is then transferred into the HC waveguide via an on chip mode transformer.

Figure 3:
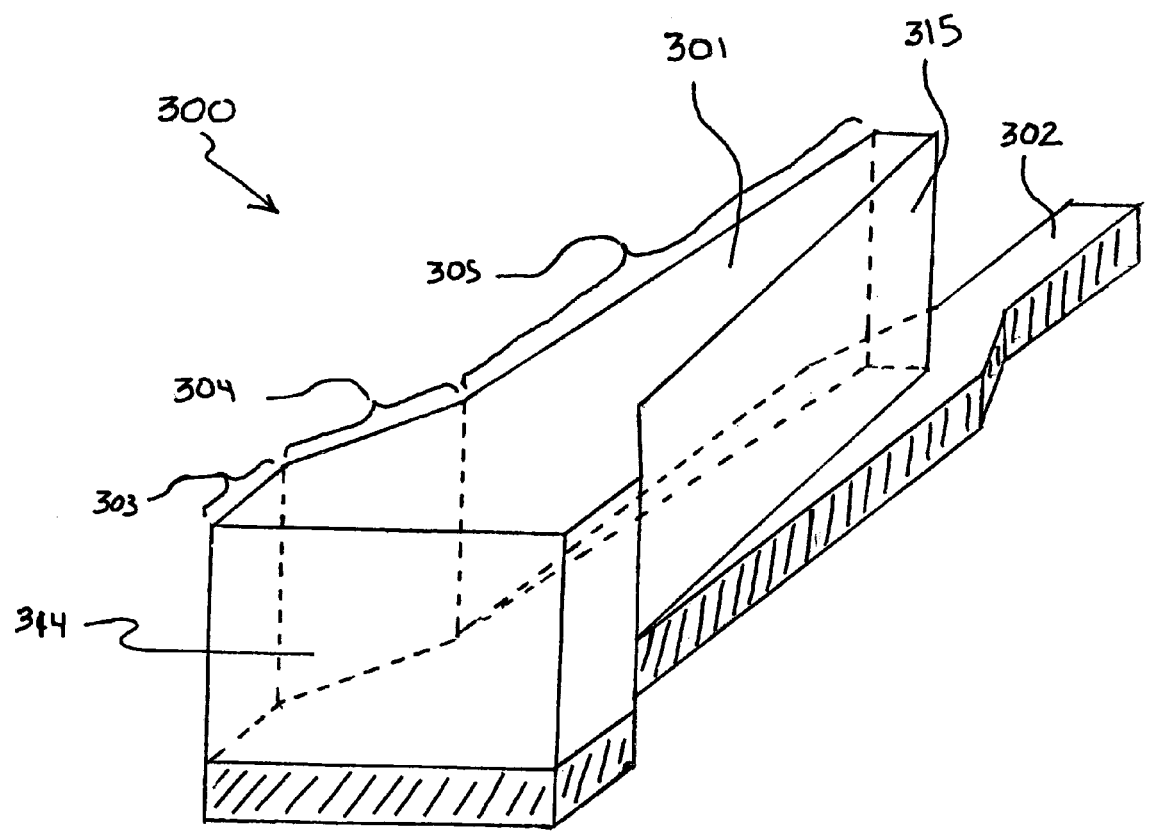
FIG. 3 shows a perspective view of one embodiment of the present mode shape transformer invention.

FIG. 3 shows a perspective view of the mode shape transformer. The mode transformer has two waveguide layers, one contiguously on top of the other. The first layer (302), also called the bottom layer, is the core of the HC waveguide layer that makes up the rest of chip's optical circuit. This wavegudie is often called the "bus". The second layer (301), which is on top of the first, is usually a much thicker layer and in conjuction with the first layer, is used to capture all of the light from an optical fiber. The refractive index of each layer may be different. When both waveguides are taken together, we call the structure the "compound waveguide" or "composite waveguide". The composite waveguide supports a fundamental optical mode which we call the "fundamental mode of the composite waveguide". The HC bus by itself (in the absence of the second layer), supports a fundamental waveguide mode which we call the HC mode. We are interested in capturing all the power from an optical fiber into the HC mode. The second layer, and its associated geometry, facilitates this power transfer.

Figure 4:
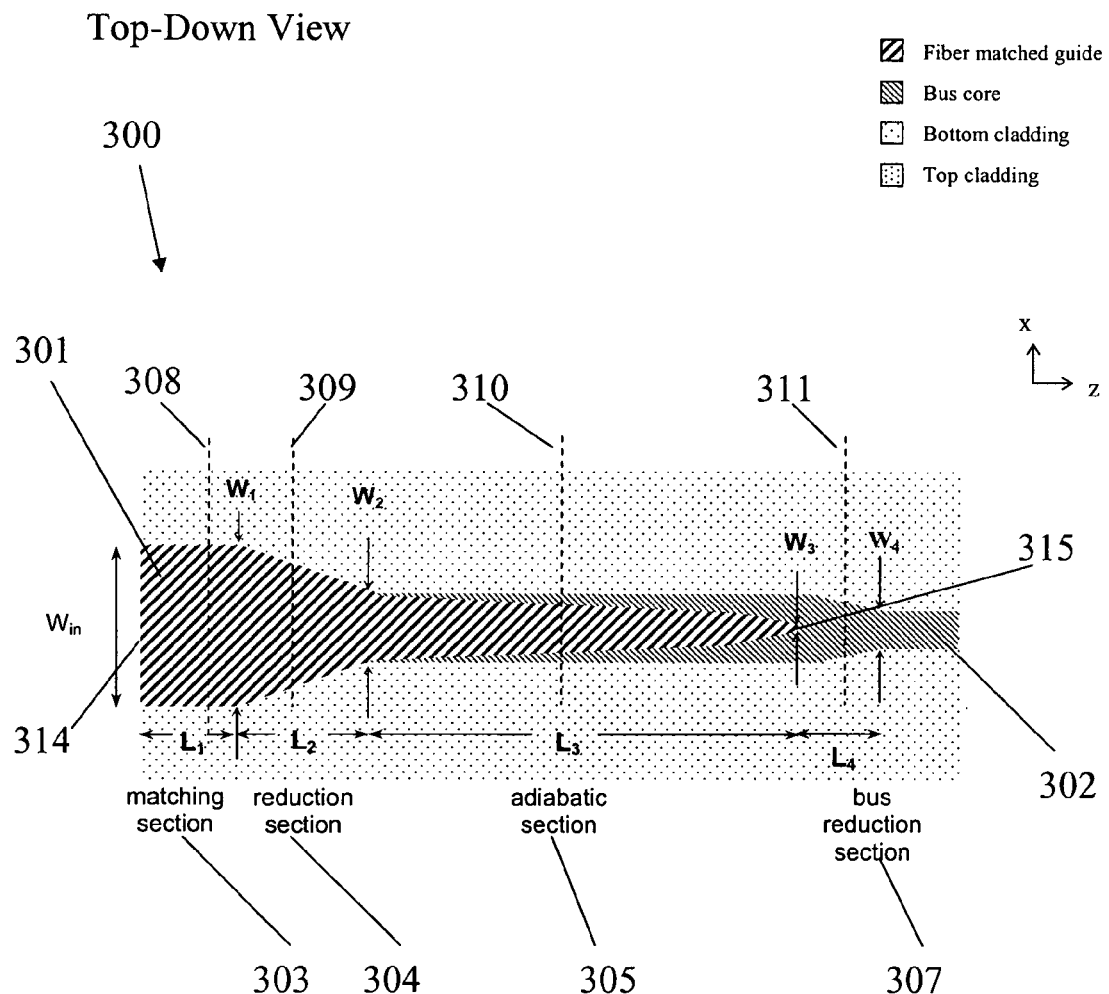
FIG. 4 shows a top-down view of one embodiment of the present mode shape transformer invention.
Figure 6:
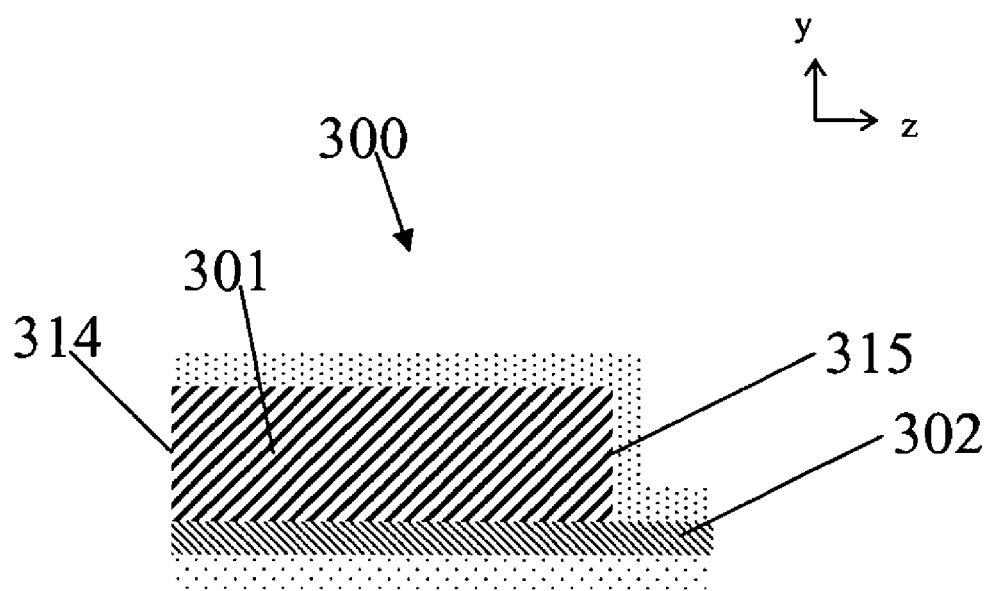
FIG. 6 shows a longitudinal cross sectional view of one embodiment of present mode shape transformer invention.

FIG. 4 shows a top-down view of the mode shape transformer that was shown in FIG. 3, and highlights its salient features. Cross-sections at various positions along the mode transformer in FIG. 4 are shown with corresponding numerals in FIG. 5. The mode transformer can have four or more longitudinal sections. Not all sections are necessarily needed. They each help to maximize the power transfer efficiency and minimize the overall length of the device. The purpose of each section is now described.

Section 1. Fiber mode matching section. The fiber mode matching section is shown in FIG. 4 (303). A cross section of the mode matching section along the dashed line in FIG. 4 (308) is shown in FIG. 5a (308). The purpose of this section is to match the spot size of the optical fiber to that of the composite waveguide comprising of the bottom (302) and top (301) guiding layers. The cross sectional dimensions of the composite structure (that is, its height and width) are chosen so as to optimize this spot size matching. This section facilitates the coupling of a fiber to a chip, while the following sections serve to reduce the spot size and couple the power into the HC mode. The length of the mode matching section (303) is arbitrary, but is made sufficiently long so that there is room to dice and polish the chip without affecting the following sections.

Section 2. Lateral mode reduction section. The lateral mode reduction section is shown in FIG. 4 (304). A cross section of the lateral mode reduction section along the dashed line in FIG. 4 (309) is shown in FIG. 5b (309). In this section the lateral width of both top (301) and bottom (302) waveguide layers are simultaneously reduced (tapered) from $W_1$ down to $W_2$, as shown in FIG. 4. The length $L_2$ is chosen long enough so that there is no optical loss, or any optical mode conversion from the fundamental mode of the composite waveguide to higher order modes of the composite waveguide. The width $W_2$ is usually optimized to maximize transformer efficiency while minimizing length, but in general will be about 2 μm to 4 μm. Its exact value is not critical. The taper shape shown in FIG. 4 is linear, but can be other shapes such as parabolic or exponential. The taper shape can be optimized to maximize transformer efficiency and/or minimize transformer length.

Section 3. Adiabatic taper region. The adiabatic taper section is shown in FIG. 4 (305). A cross section of the lateral mode reduction section along the dashed line in FIG. 4 (310) is shown in FIG. 5c (310). In this section, the top waveguide (301) is tapered down from $W_2$ to $W_3$, over a length of $L_3$, as shown in FIG. 4. The bus portion of the composite guide (302) is usually not tapered down, or is tapered down only slightly. In this section, the power residing in the top waveguide is coupled to, and forced downward, into the bottom bus waveguide. At the end of this section most of the power resides in the lower bus waveguide. The top waveguide (301) terminates with a certain width $W_3$, after a length $L_3$. The taper length $L_3$ is made long enough so that there is no radiation losses, and no mode conversion of power to higher order modes of the composite waveguide. $W_3$ is usually optimized to maximize transformer efficiency, while minimizing length, but in general will be about 0.0 μm to 1.0 μm. The minimum width is usually limited by lithographic patterning of the feature. The reason this section is called adiabatic is because the location of the bulk of the optical power changes from the top guide to the bottom guide without radiation loss or without excitation to the higher order modes. The adiabatic taper shape in FIG. 4 is shown to be linear, but can be other shapes such as parabolic or exponential. The taper shape can be optimized to maximize transformer efficiency and/or minimize transformer length.

Section 4. Bus guide reduction section. The bus width reduction section is shown in FIG. 4 (307). A cross section of the bus width reduction section along the dashed line in FIG. 4 (311) is shown in FIG. 5*d* (311). In section 4, the bottom bus waveguide is tapered down from width $W_2$ to width $W_4$, over a length of $L_4$, as shown in FIG. 4 (307). Typically $W_4$ will be the desired bus width used throughout the rest of the optical circuit. The length $L_4$ is chosen long enough so that there is no optical loss in this taper section. The taper shape of the width reduction section in FIG. 4 is shown to be linear, but can be other shapes such as parabolic or exponential. The taper shape can be optimized to maximize transformer efficiency and/or minimize transformer length. Section 4 is not part of the mode transformer strictly speaking because at the start of section 4, all of the optical power is already in the bus waveguide, which was the objective of the invention. Section 4 is merely added to emphasize that the width of the bus layer can be adjusted to accommodate the preferred width for the rest of the optical circuit.

To summarize, the mode shape transformer works in the following way. An optical fiber is brought up to the input of the mode transformer so as to lie parallel on the same axis as the mode transformer, and to be laterally and vertically positioned so that the input end of the mode transformer can accept all the input light from the fiber with low loss. The dimensions of the mode transformer at the input end (301) are such that when the fiber is properly positioned all of the optical power in the fiber is captured. The field in the mode transformer continues to propagate axially down the device. The width of the mode transformer, including the top and bottom waveguides, is tapered down to a more narrow dimension. Following this section only the top waveguide portion of the mode transformer is further reduced, possibly at a different rate or at multiple rates, over some length. Over this length the optical power evolves from being substantially all in the top waveguide to substantially being all in the bottom waveguide. The taper rate in this section in conjunction with the final width of the top waveguide is such so as to induce low loss and to cause this mode evolution from the top guide into the bottom guide.

FIG. 9 shows a numerical simulation of the optical field at various positions within the mode transformer. The numerical simulations were carried out using the Finite-Difference Beam Propagaiton Method which is well known in the art and also available commercially, (For example, by Rsoft Inc. of Ossining, N.Y., and Apollo Photonics Inc. of Burlington, Ontario, Canada). FIG. 9*a* shows a top down view of the simulated structure. FIGS. 9*b* to 9*e* show the field at various cross sections corresponding to the dashed lines in FIG. 9*a* (410, 411, 412, 413). The field shown in FIG. 9*b* matches that of a predetermined fiber spot size. As shown in FIGS. 9*c*, 9*d*, and 9*e*, as the upper waveguide layer width becomes narrower, the optical field essentially gets pushed down into the lower waveguide layer. Near the end of the upper waveguide tapered region (414, and similar to FIG. 3, 315), substantially all of the optical power is located in the lower waveguide.

Method of Fabrication

Figure 1:
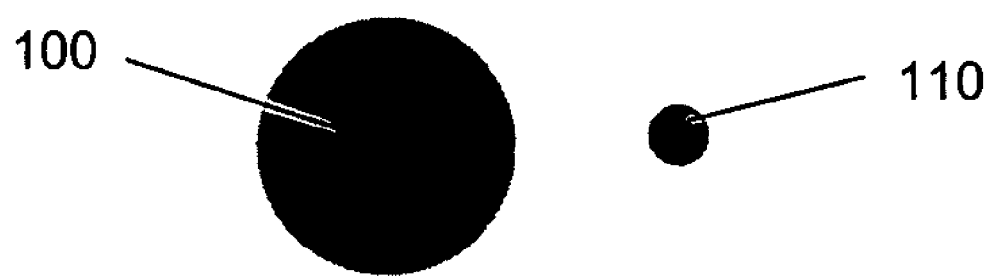
FIG. 1 shows the relative sizes of a single mode fiber spot size and that of a high index contrast waveguide.
Figures 1, 7:
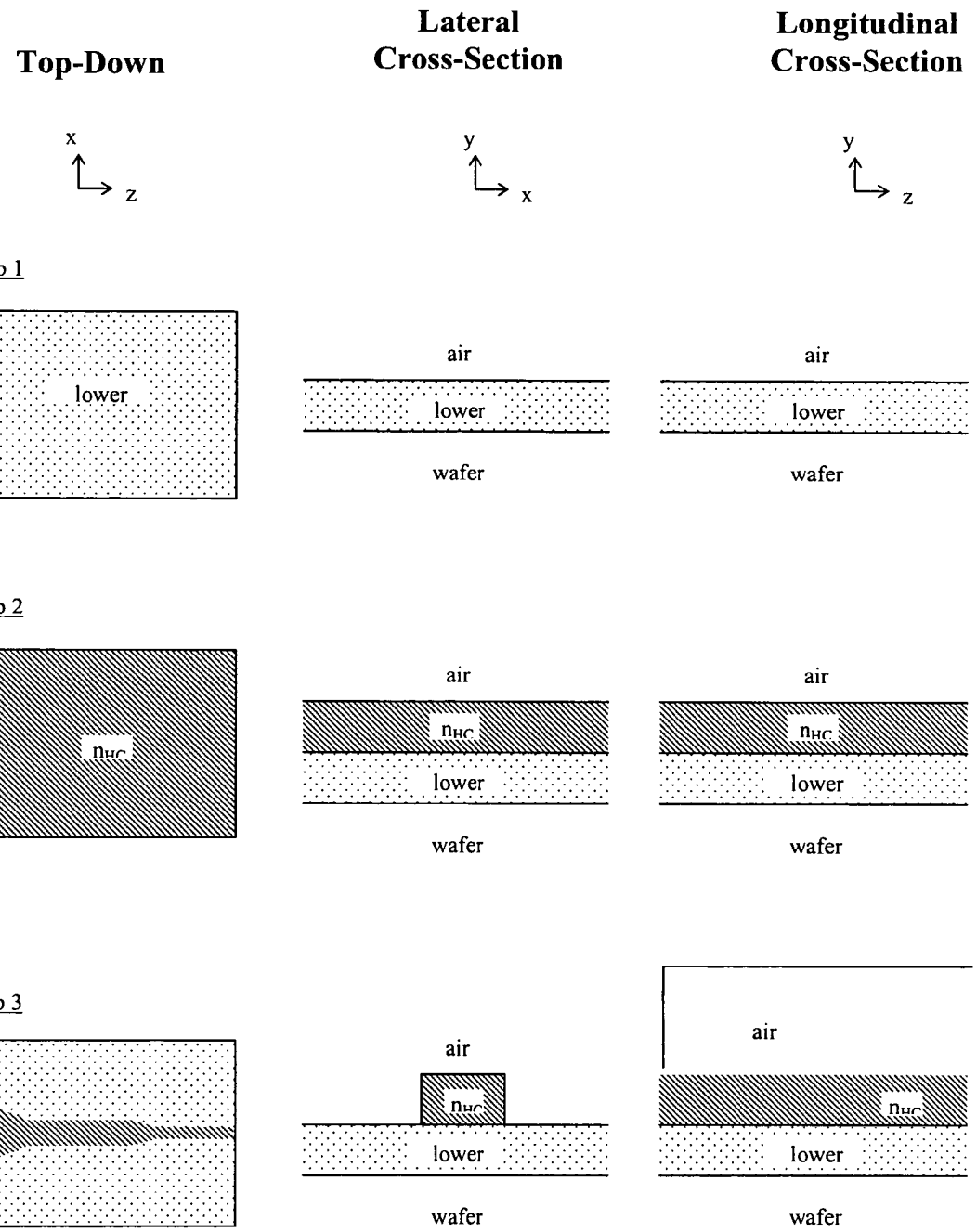
FIG. 7 shows a series of steps in the fabrication of of one embodiment of present mode shape transformer invention.
Figures 2, 7:
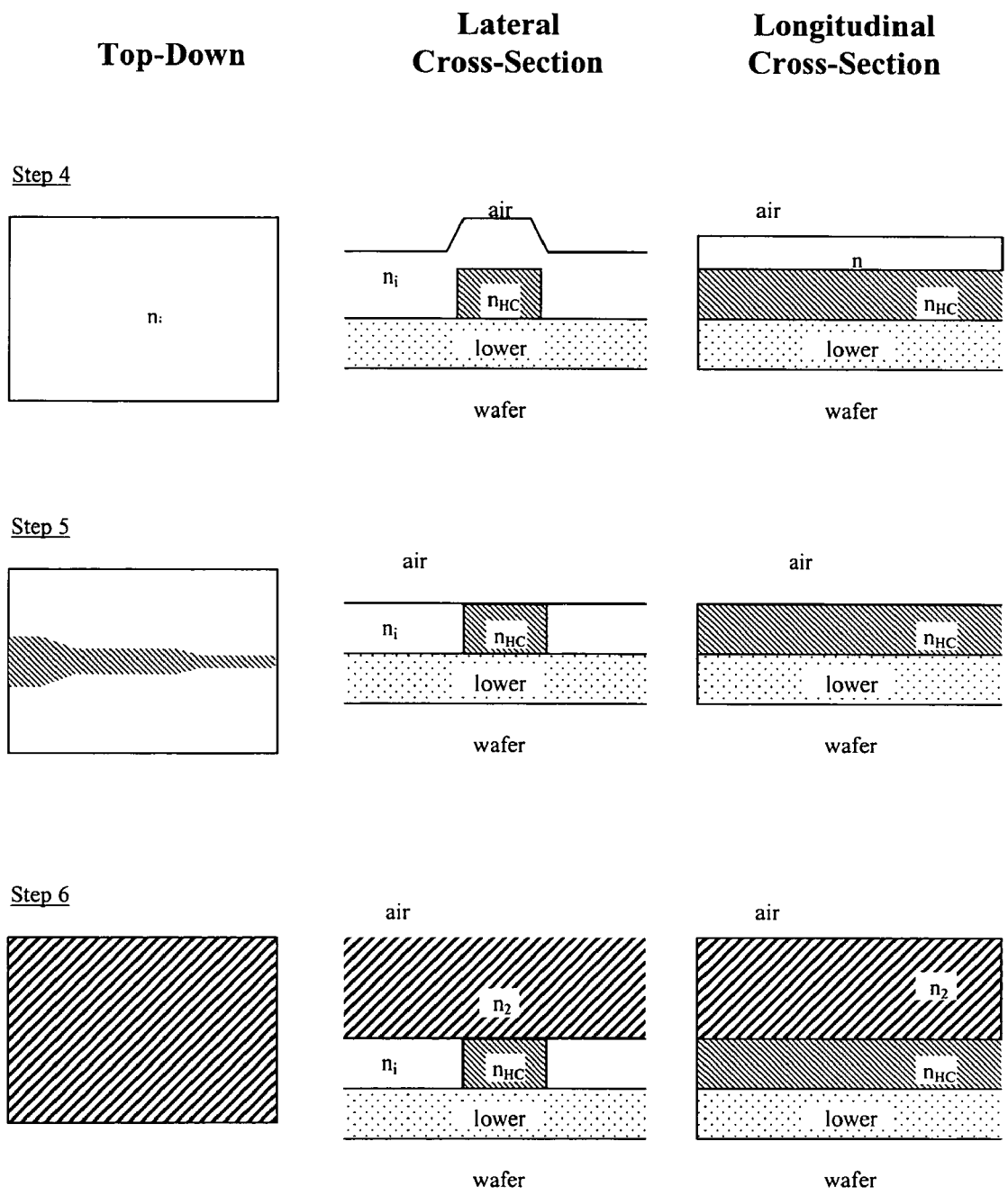
Figures 3, 7:
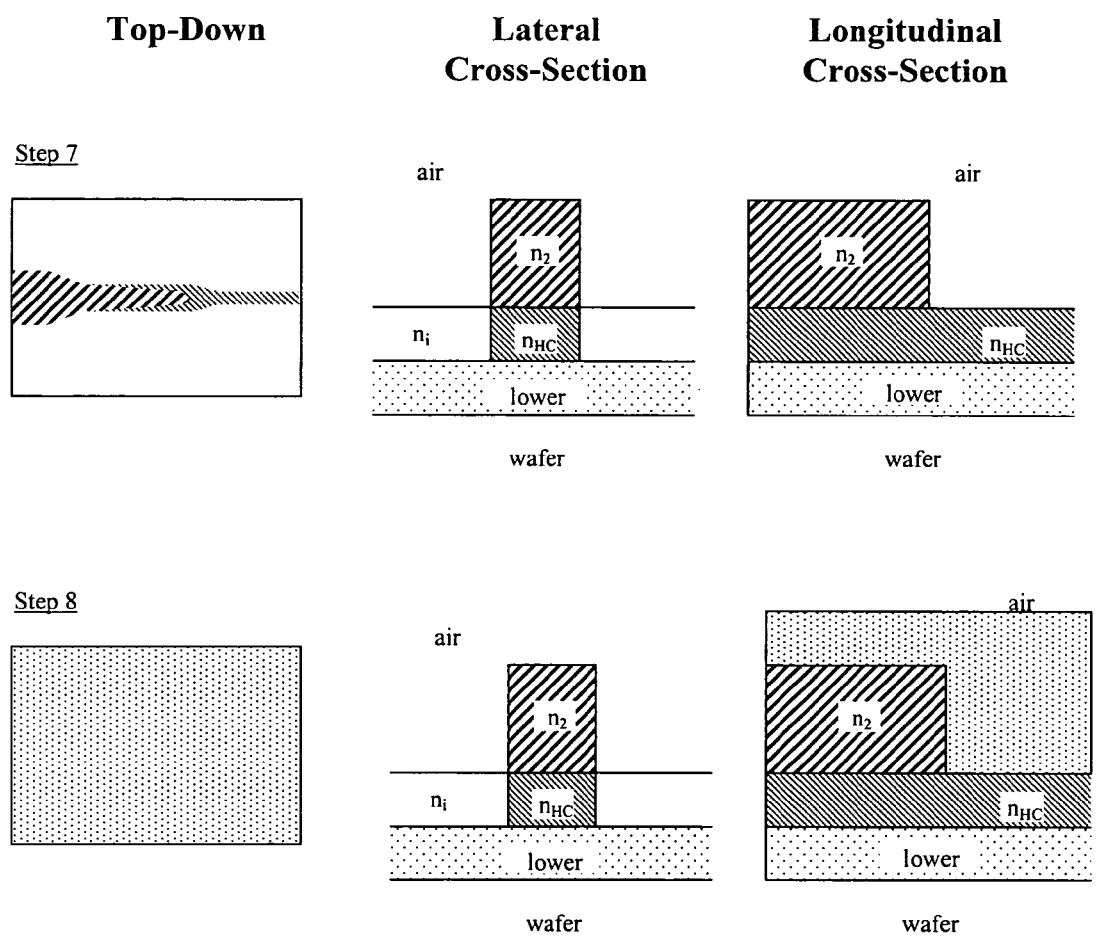

The method of fabrication described here relates to the sequence of steps illustrated in FIGS. 7-1, 7-2, and 7-3. The three columns in FIGS. 7-1 to 7-3 show the top down view, the lateral cross section view, and the longitudinal cross section view. The longitudinal cross section is along the center axis of the waveguide. There are some novel fabrication steps, as well as some more conventional steps. Details of conventional fabrication techniques may be found in Hiroshi Nishihara, Masamitsu Haruna, Toshiaki, Suhara, "Optic integrated circuits" McGraw-Hill, 1985.

Step 1. A substrate wafer is chosen as a carrier onto which various dielectric layers will be deposited or grown. Common substrates include silicon, quartz, and indium phosphide. Often, a lower cladding material is deposited or grown on the substrate for the purpose of acting as a lower cladding or buffer to shield the optical mode from the substrate. A typical buffer layer on silicon is silicon dioxide as used in the present invention. The first step in FIG. 7-1 shows a cross section of a wafer with a lower clad. The lower clad is typically 3 μm to 15 μm thick.

Step 2. The core layer of the High Contrast (HC) waveguide is deposited as a thin film. Common deposition techniques include chemical vapor deposition (CVD), sputtering, flame hydrolysis deposition, epitaxial growth, ebeam deposition, and spin on glasses or silicon oxynitride, compound glasses such as tantalum-oxide:silica ($Ta_2O_5:SiO_2$), spin on glass, optical polymers, and quaternary compounds such as aluminum-gallium-arsenide-phosphide. The amount of material deposited is determined by design requirements, and is well controlled in the deposition steps. The second step in FIG. 7-1 shows a cross section of the chip with a thin film layer of core material used for the HC waveguide. In the present invention, the core is silicon oxynitride with $n_{HC}=1.65$.

Step 3. Photoresist is spun onto the wafer, and the optical circuit layout is photographically patterned into the photoresist. The pattern comes from a design mask that is used as a photographic plate. The design includes any tapering within the mode transformer sections for the HC layer. The photoresist pattern is transferred into the HC layer by standard etching techniques that use the photoresist as a mask. Etching techniques include chemical wet etching or reactive ion etching. After pattern transfer, the remaining photoresist is striped away, leaving a ridge or strip of HC core material that forms the core of the HC optical circuit. The third step in FIG. 7-1 shows a cross section of the chip after the HC thin film layer has been etched, and the photoresist has been striped off.

Figure 2:
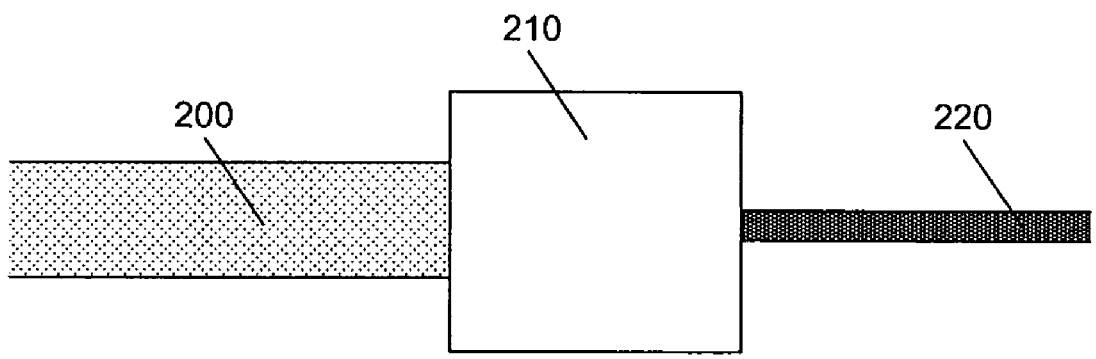
FIG. 2 shows a functional block diagram of a mode shape transformer.

Step 4. An intermediate cladding material with index $n_i$ is deposited or grown on the surface of the wafer covering the HC waveguide to a thickness greater than the core depth. This material can be any described in the previous steps, but will have an index that is lower than that of the HC layer (that is $n_i<n_{HC}$). Because of the topography, the top surface of this layer may not be planar. For example, there may be a ridge over the waveguide, as depicted in step 4 of FIG. 7-2. Step 4 in FIG. 7-2 shows a cross section of the chip after top cladding material has been deposited over the wafer.

Step 5. It is desired to have the HC waveguide encapsulated in the cladding material on all sides, except for the top surface of the HC waveguide. Therefore, the cladding that was deposited in step 4 must be removed down to a thickness of the HC waveguide height.

Although not absolutely necessary, it is desirable that the top surface be planarized to give a flat surface across the chip or wafer. The top cladding can be planarized by well known techniques such as etch back and/or polishing. It is important to make sure that there is no cladding material left on the top surface of the HC waveguide after planarization. Remaining material would interfere with the power transfer mechanism. The fifth step in FIGS. 7-2 shows a cross section of the chip after planarization down to the top surface of the HC waveguide.

Step 6. Similar to step 2, material is deposited or grown over the surface of the wafer. This material will comprise the second, or top core layer, and will have a refractive index of $n_2$. Any of the foregoing materials discussed in the previous steps may comprise this second core layer. In general, the index of this material will be close to, but not necessarily equal to, the index of the HC waveguide. Step 6 of FIG. 7-2 shows a cross section of the chip after the second core layer is deposited.

Step 7. Similar to step 3, photoresist is spun onto the wafer, and the second core layer is photographically patterned. The pattern is transferred to the second core layer by etching the material. The photoresist is striped away, resulting in ridges that are now the second core layer, and which lie directly above the first core layer. Any tapering within the mode transformer section for the second core are contained on the lithographic mask. Step 7 in FIG. 7-3 shows a cross section of the chip after material for the second core layer has been etched, and the photoresist has been striped.

Step 8. Finally, cladding material is deposited over the entire wafer. Step 8 in FIG. 7-3 shows a cross section of the wafer with a top cladding layer deposited over the entire surface. The surface of the top layer may or may not be planar. If a planar surface is desired, planarization techniques similar to those described in Step 5 may be used.

Figures 1, 8:
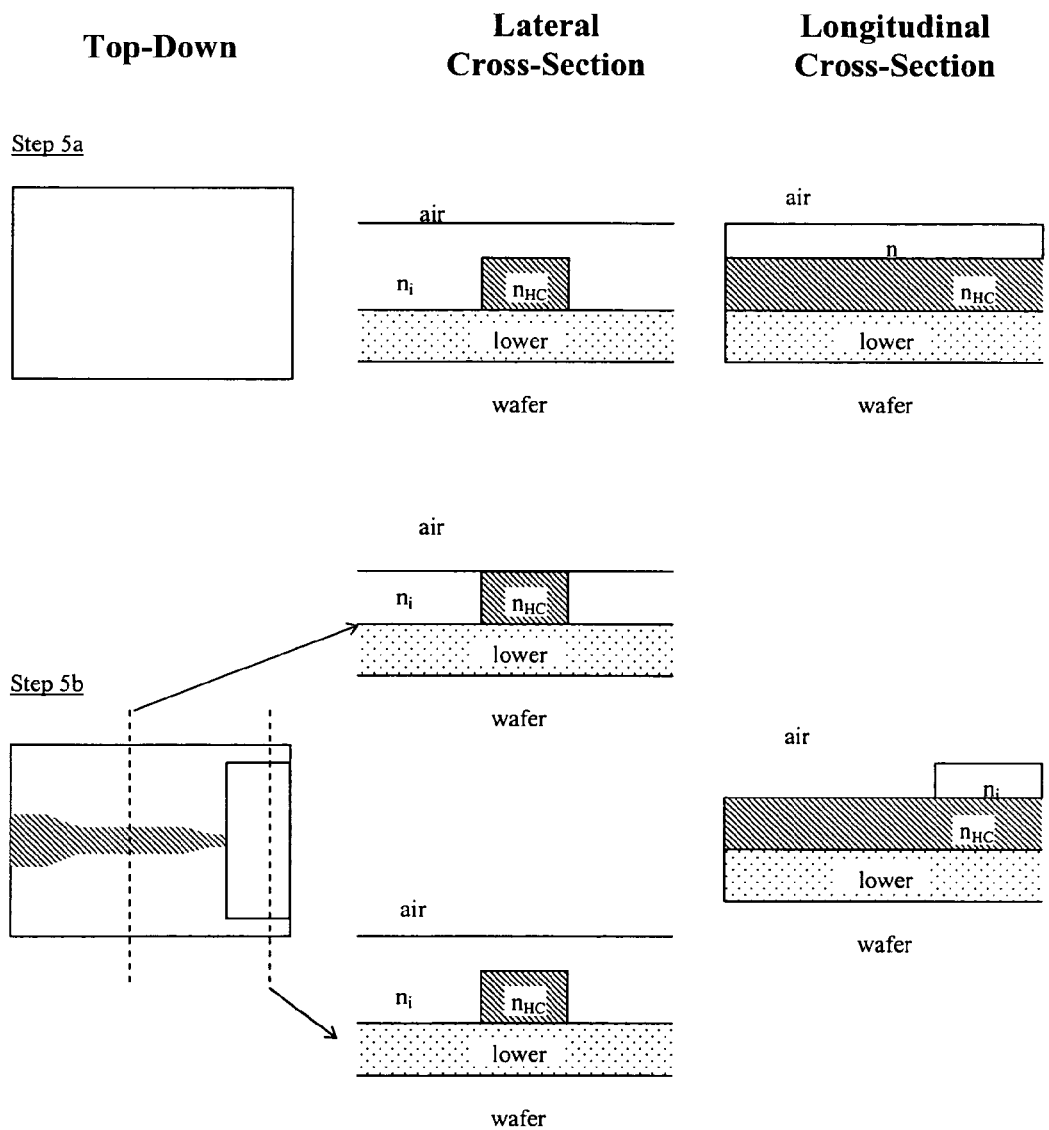
FIG. 8 shows an alternate series of steps in the fabrication of of one embodiment of present mode shape transformer invention.
Figures 2, 8:
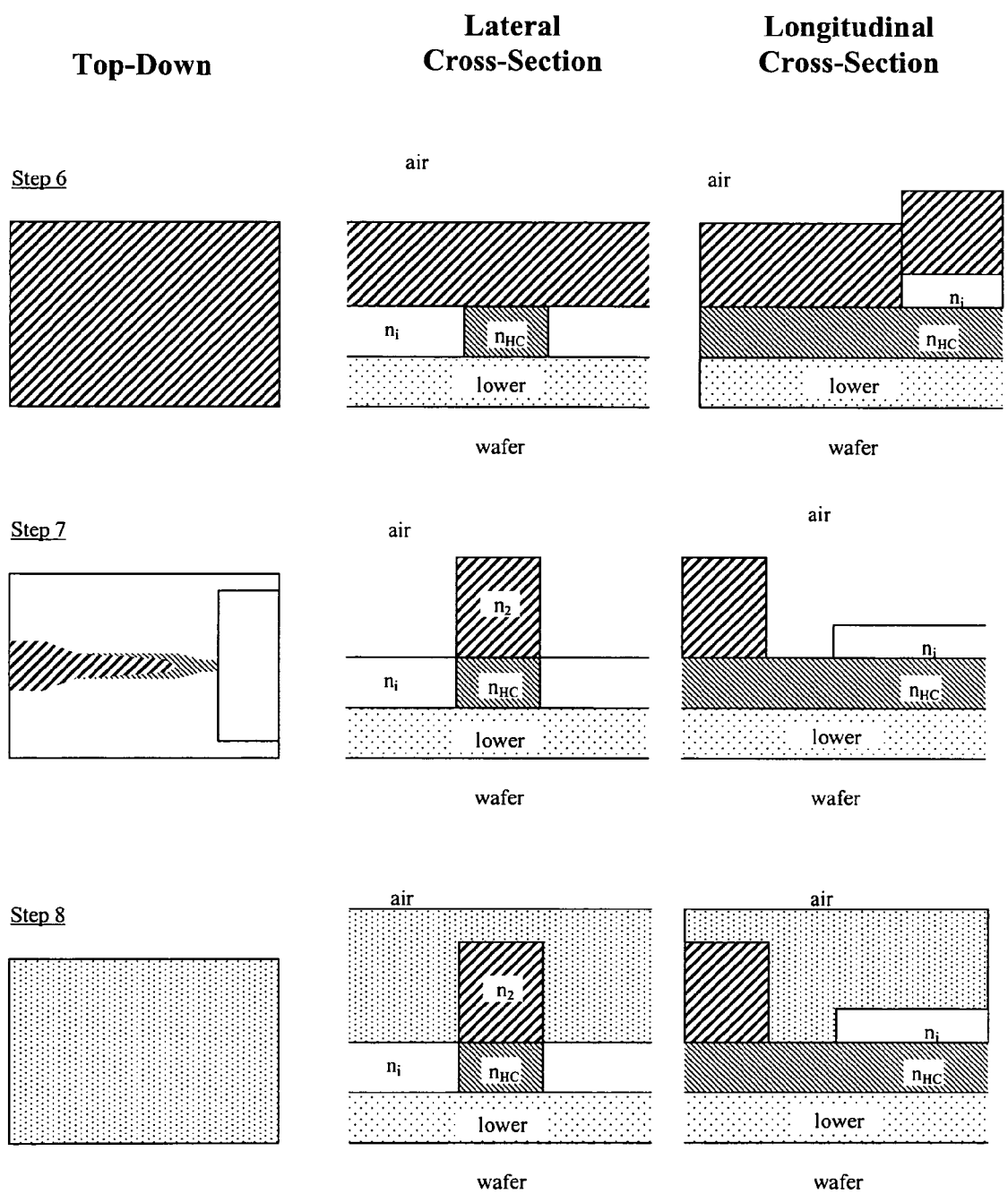

As highlighted in step 5 of FIG. 7-2, in the transformer region of the chip, it is important that there be little or no cladding material left on the top surface of the HC waveguide after planarization. Also, it is important that there be no second core layer material left on the chip surface after etching except where the mode transform resides. That is, the second core must be etched all the way through its height. These foregoing planarization and etching steps needed to remove material might affect the HC waveguide core. For example, either over-planarizing or over-etching may reduce the thickness of the HC core layer. This in turn might affect the rest of the optical circuit performance (although it will generally not affect the performance of the mode transformer). In order to protect the rest of the HC optical circuit, step 5 might be modified as shown in FIGS. 8-1 and 8-2. In modified Step 5*a*, FIG. 8-1, the first cladding layer is planarized, but not down to the top surface of the HC waveguide. There is some material remaining above the HC guide in order to protect it. Next, in Step 5*b*, FIG. 8-1, the portion of the HC optical circuit not containing the mode transformer is masked off (protected), and the planarization or etching is continued down to the top surface of the HC guide. In this way, all the cladding material is removed down to the top surface of the HC waveguide in that portion of the circuit that contains the mode transformer, while in all other portions of the circuit, there is a protective layer of cladding over the HC guide. The remaining steps 6 to 8 in FIG. 8-2 are similar to those described previously in FIGS. 7-2 and 7-3, and the resulting views are shown in FIG. 8-2.

While the preferred embodiments have been described, it will be apparent to those skilled in the art that various modifications may be made to the embodiments without departing from the spirit of the present invention. Such modifications are within the scope of this invention.

What is claimed is:

1. An integrated optical mode shape transformer comprising:
    (a) a composite waveguide having an input end and an output end, the input end supporting an input fundamental optical mode having a first spot size, the output end supporting an output fundamental optical mode having a second spot size,
    (b) said first spot size being larger than said second spot size,
    (c) said composite waveguide further comprising a first waveguide layer having a first refractive index value and a first thickness value,
    (d) said composite waveguide further comprising a second waveguide layer having a second refractive index value and a second thickness value,
    (e) said second layer having a width that is laterally tapered down from input end of said composite waveguide to output end of said composite waveguide, and
    (f) means for fabricating second waveguide layer on top of said first waveguide layer.

2. The transformer of claim 1 wherein said first refractive index value and said second refractive index value are the same.

3. The transformer of claim 1 further comprising:
    (a) providing an input fiber having a predetermined spot size, said input fiber positioned at input end of said composite waveguide,
    (b) said first waveguide layer having a width at said input end matching that of said fiber spot size, and
    (c) said second waveguide layer having a width at said input end matching that of said fiber spot size.

4. The transformer of claim 3 wherein sum of said first thickness of said first waveguide layer and said second thickness of said second waveguide layer is substantially the same as said input fiber spot size.

5. A method of fabricating an integrated optical mode shape transformer comprising the steps of:
    (a) means for depositing a first waveguide layer on a substrate, said first waveguide layer having a first refractive index value, a first thickness value, and an input end,
    (b) means for fabricating a second waveguide layer on top of said first waveguide layer, said second layer having a second refractive index value, a second thickness value, an input end, and an output end,
    (c) said second layer having a width that is laterally tapered down between said input end and said output end
    (d) said means for fabricating second waveguide consists of the steps of depositing a lower refractive index material over said first waveguide, means of planarizing back said lower refractive index material so as to expose the top surface of said first waveguide layer,
    (e) means for depositing said second waveguide layer on top of said first waveguide layer, and
    (f) said means of planarizing consists of one or more of polishing, chemical mechanical polishing, or a multiple dep-and-etch process.

6. The transformer of claim 5 wherein said first refractive index value and said second refractive index value are the same.

7. The transformer of claim 5 wherein said means of depositing includes one or more of chemical vapor deposition, sputtering, spin coating, epitaxial growth, ebeam deposition, or flame hydrolysis deposition.

8. The transformer of claim 3 wherein said first spot size of said composite waveguide matches said spot size of input fiber.

* * * * *

UNITED STATES PATENT AND TRADEMARK OFFICE
CERTIFICATE OF CORRECTION

| | |
|---|---|
| PATENT NO. | : 7,079,727 B1 |
| APPLICATION NO. | : 10/684899 |
| DATED | : July 18, 2006 |
| INVENTOR(S) | : Brent E. Little |

It is certified that error appears in the above-identified patent and that said Letters Patent is hereby corrected as shown below:

Column 4, Line 62: After the word "passive" insert the word -- guide --.

Column 5, Line 29: After the word "fabrication" delete the word "of".
          Line 32: Delete the word "of" at the beginning of the line.
          Line 54: Delete the word "wavegudie" and replace with -- waveguide --.

Column 7, Line 48: Delete the word "Propagaiton" and replace with -- Propagation --.

Column 8, Line 21: After the words "glasses or" insert -- polymers. Common materials that form the core are doped silica, silicon, silicon nitride, --.

Signed and Sealed this

Tenth Day of April, 2007

JON W. DUDAS
*Director of the United States Patent and Trademark Office*